Oct. 9, 1923.

E. MILLER 1,470,023

GLASS FEEDING MECHANISM

Filed Dec. 12, 1921

6 Sheets-Sheet 1

INVENTOR.
EDWARD MILLER.
BY
ATTORNEYS.

Oct. 9, 1923.

E. MILLER 1,470,023

GLASS FEEDING MECHANISM

Filed Dec. 12, 1921  6 Sheets-Sheet 2

INVENTOR.
EDWARD MILLER.

BY

ATTORNEYS.

Oct. 9, 1923.

E. MILLER 1,470,023

GLASS FEEDING MECHANISM

Filed Dec. 12, 1921    6 Sheets-Sheet 3

INVENTOR.
EDWARD MILLER.
BY
ATTORNEYS.

Oct. 9, 1923.

E. MILLER 1,470,023

GLASS FEEDING MECHANISM

Filed Dec. 12, 1921

6 Sheets-Sheet 4

INVENTOR.
EDWARD MILLER.

BY

ATTORNEYS.

Oct. 9, 1923.

E. MILLER 1,470,023

GLASS FEEDING MECHANISM

Filed Dec. 12, 1921     6 Sheets-Sheet 5

INVENTOR.
EDWARD MILLER
BY
ATTORNEYS.

Oct. 9, 1923.
E. MILLER
1,470,023
GLASS FEEDING MECHANISM
Filed Dec. 12, 1921   6 Sheets-Sheet 6
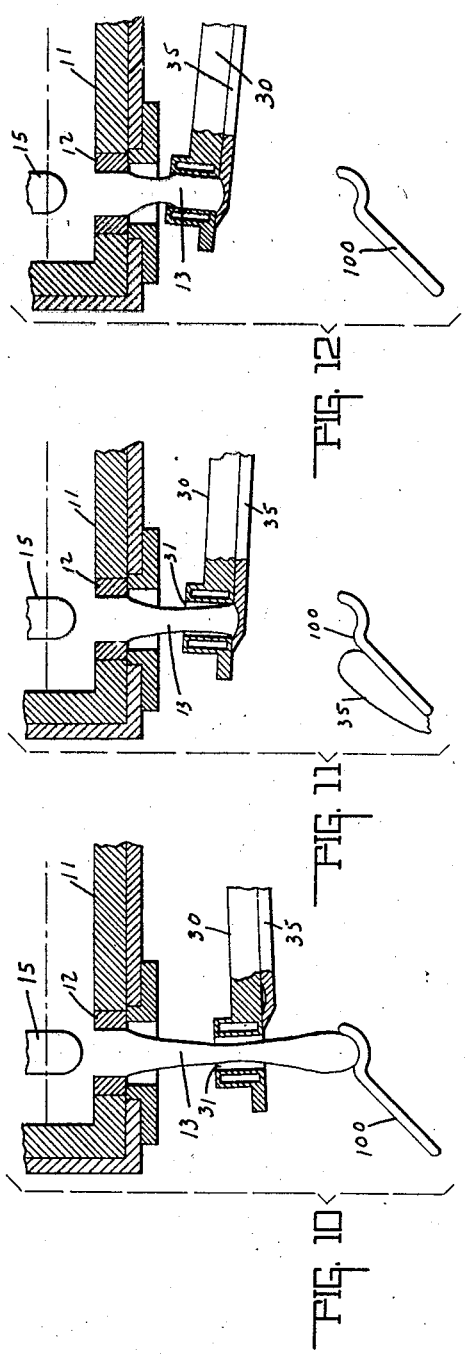
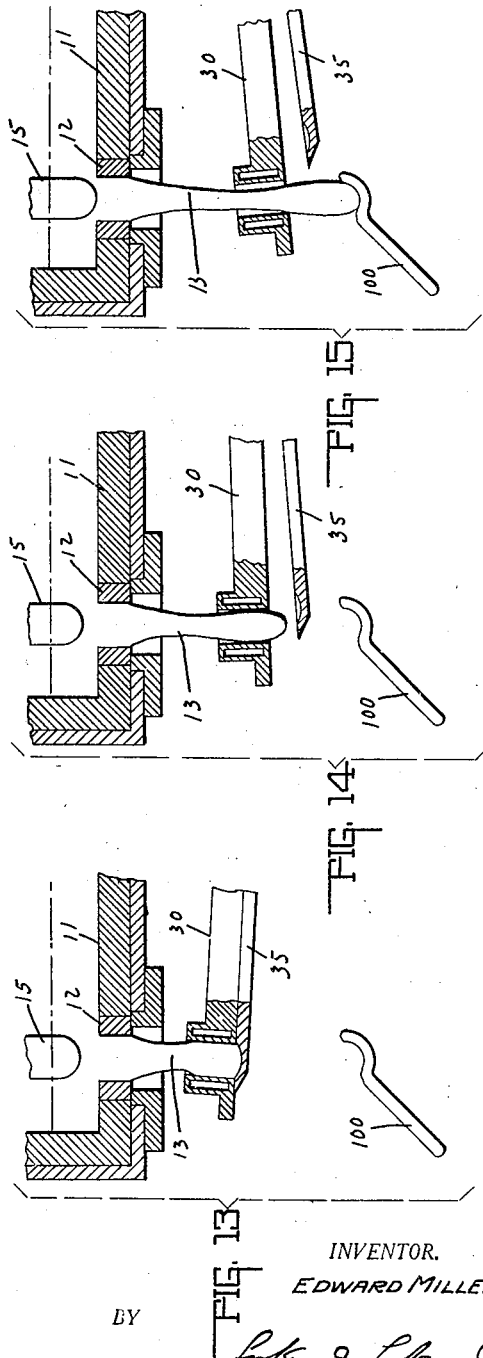
INVENTOR.
EDWARD MILLER.
BY
ATTORNEYS.

Patented Oct. 9, 1923.

1,470,023

UNITED STATES PATENT OFFICE.

EDWARD MILLER, OF COLUMBUS, OHIO, ASSIGNOR TO CHAPMAN J. ROOT, OF TERRE HAUTE, INDIANA.

GLASS-FEEDING MECHANISM.

Application filed December 12, 1921. Serial No. 521,735.

*To all whom it may concern:*

Be it known that I, EDWARD MILLER, a citizen of the United States, and a resident of Columbus, county of Franklin, and State of Ohio, have invented a certain new and useful Glass-Feeding Mechanism; and I do hereby declare that the following is a full, clear, and exact description thereof, reference being had to the accompanying drawings, in which like numerals refer to like parts.

This invention relates to mechanism for enabling glass to be fed automatically from the spout of the glass tank into the mold of a glass-making machine for the manufacture of narrow neck bottles, etc., where it is necessary on account of mold construction to drop a long slender piece of glass into the mold, also to get the live or hot glass into the bottom of the mold or where it is inconvenient or the construction of the machine makes it impossible to locate the machine so that the mold when in the charging position will be directly under the discharge outlet of the spout, and whereby the glass descends straight downward from the spout to the mold.

The chief improvement of this invention, therefore, consists in combining with the glass machine a spoon-shaped trough-like member, the bowl of which is directly under the discharge outlet of the spout and the remainder of which extends downwardly at an inclination towards the mold in such position that when the gather of glass is severed, the glass will be guided and automatically descend to and into the mold. Preferably, the construction is such that the gather of glass will not be severed until its lower end has reached the upper end of said receiving and guiding member.

The full nature of the invention will be understood from the accompanying drawings and the following description and claims.

Figure 1:
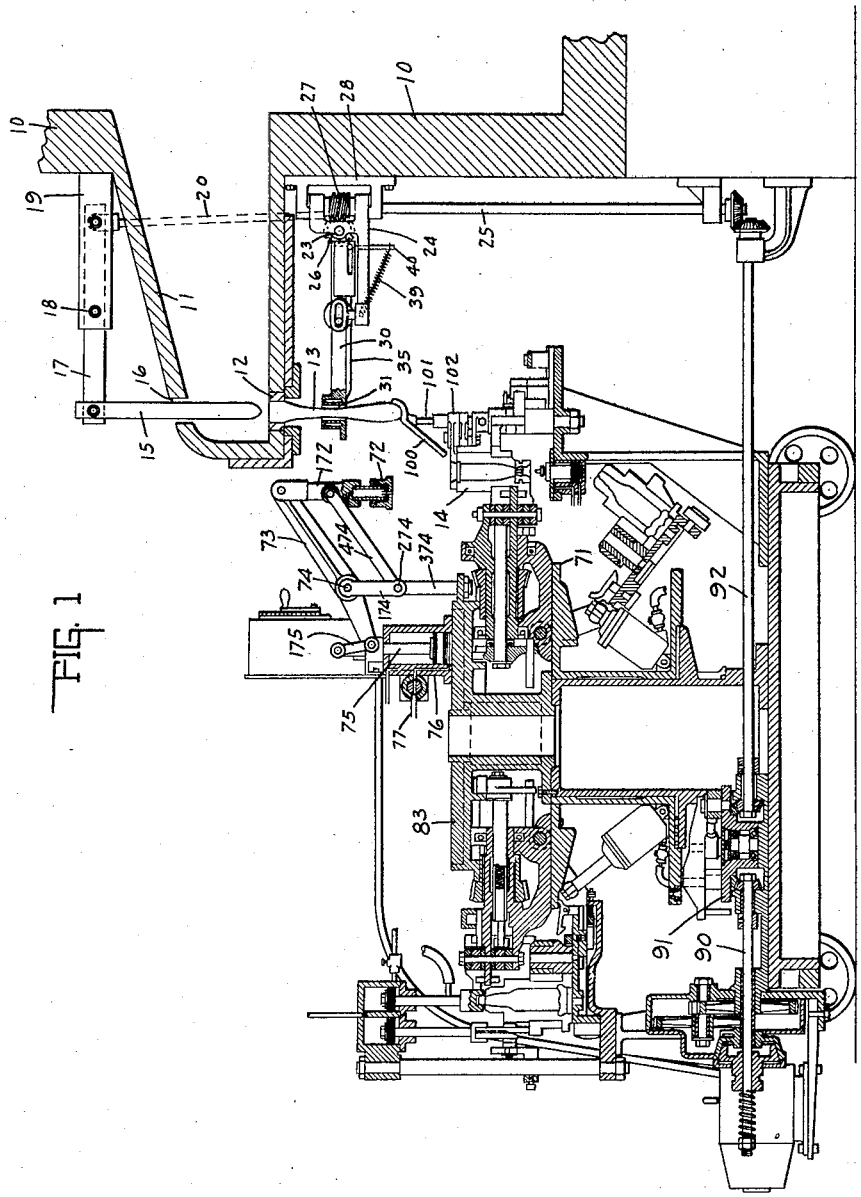
Figure 2:
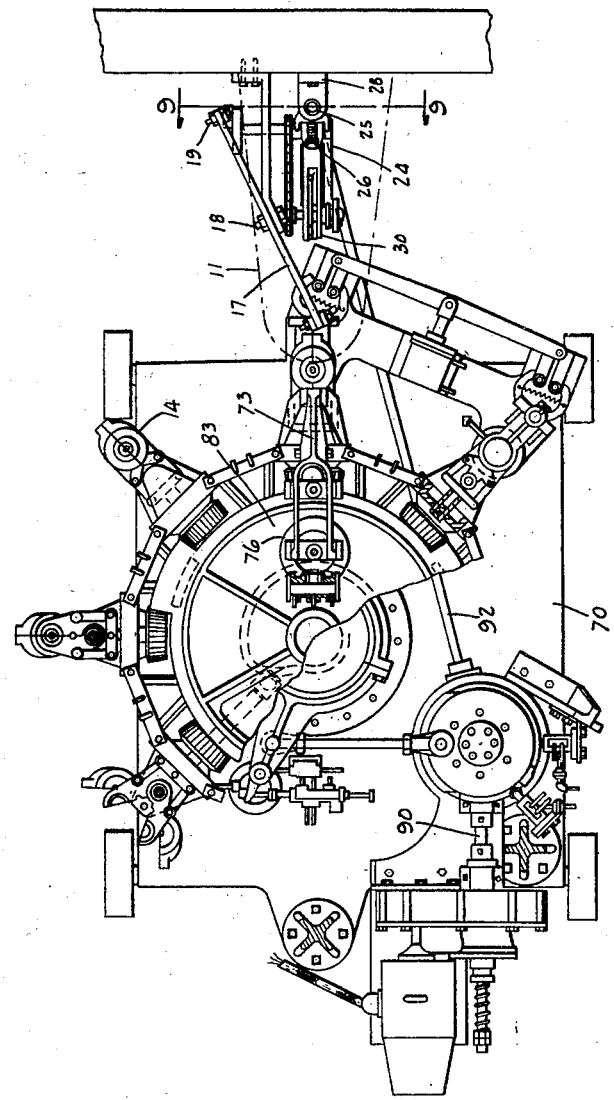
Figure 3:
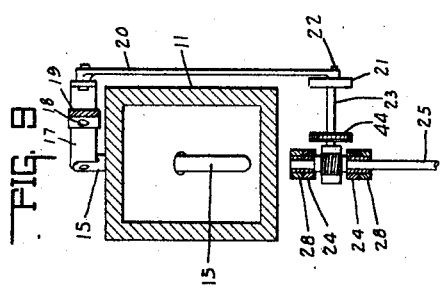
Figure 3:
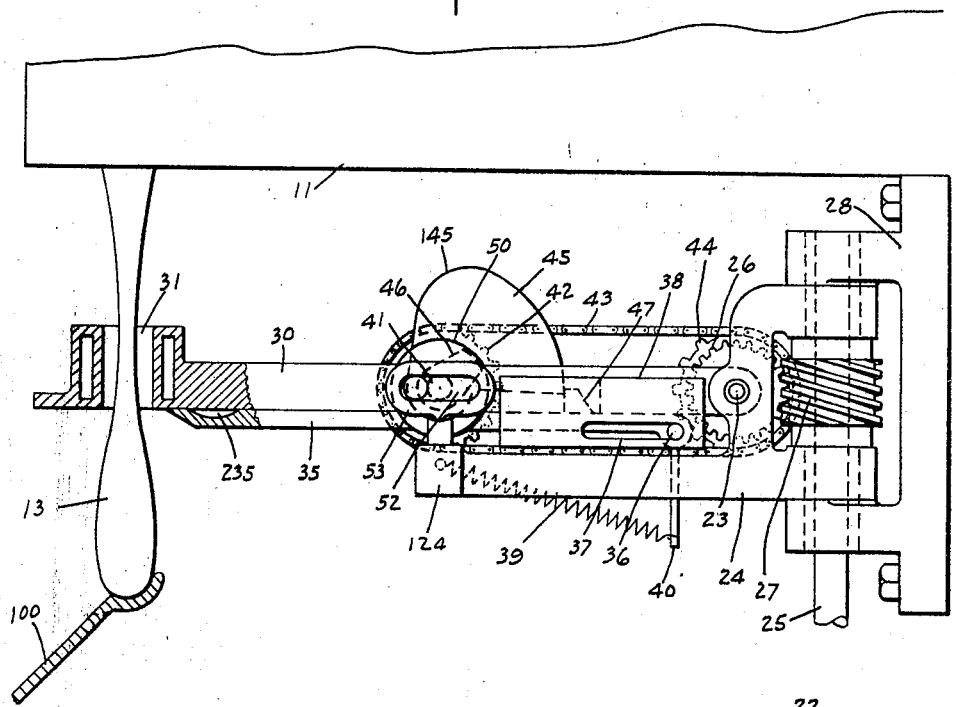
Figure 4:
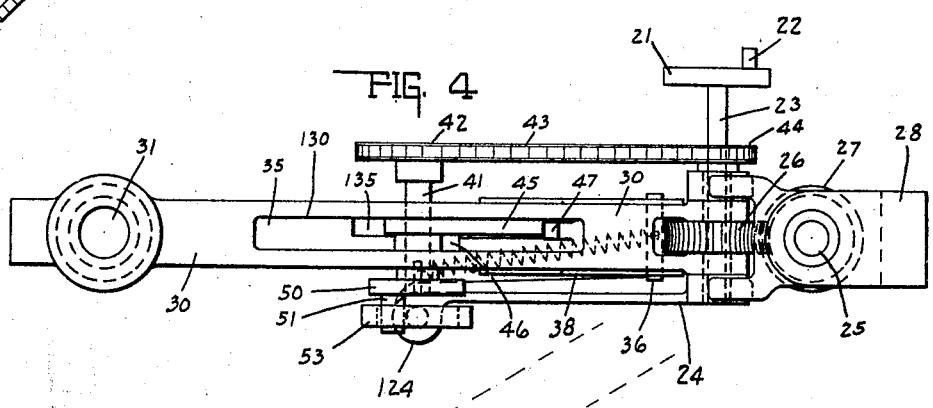
Figure 5:
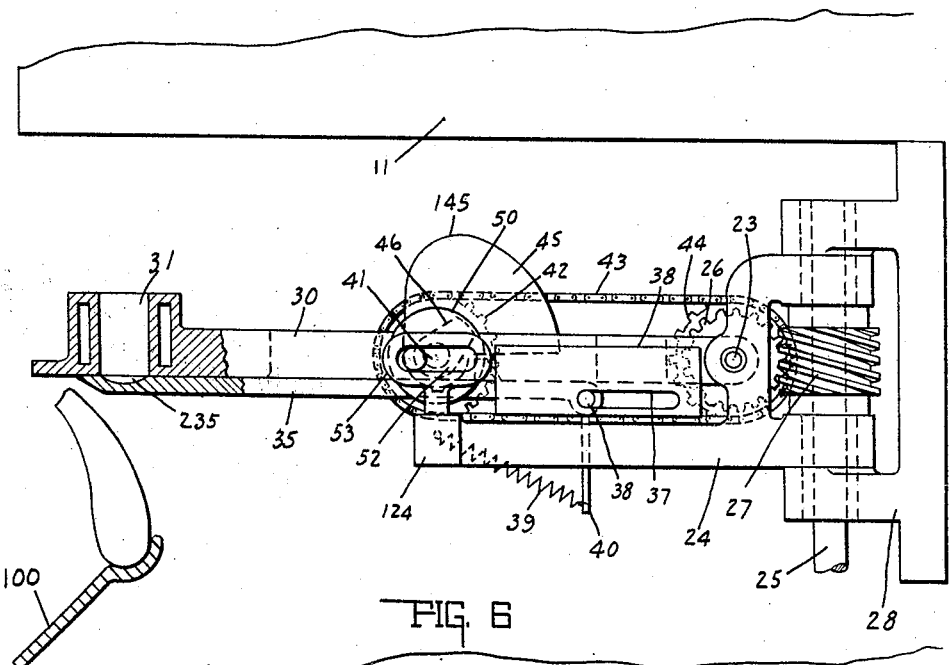
Figure 6:
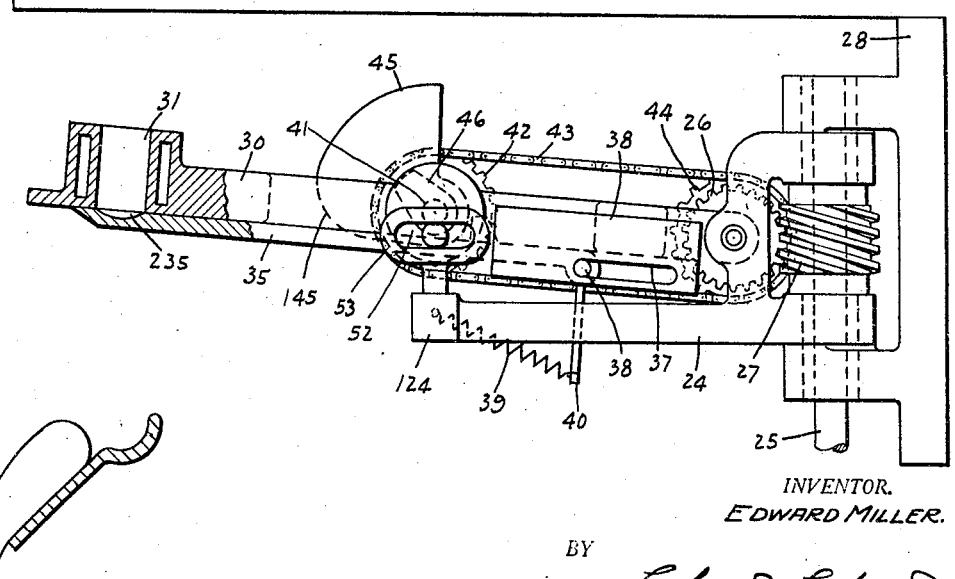
Figure 7:
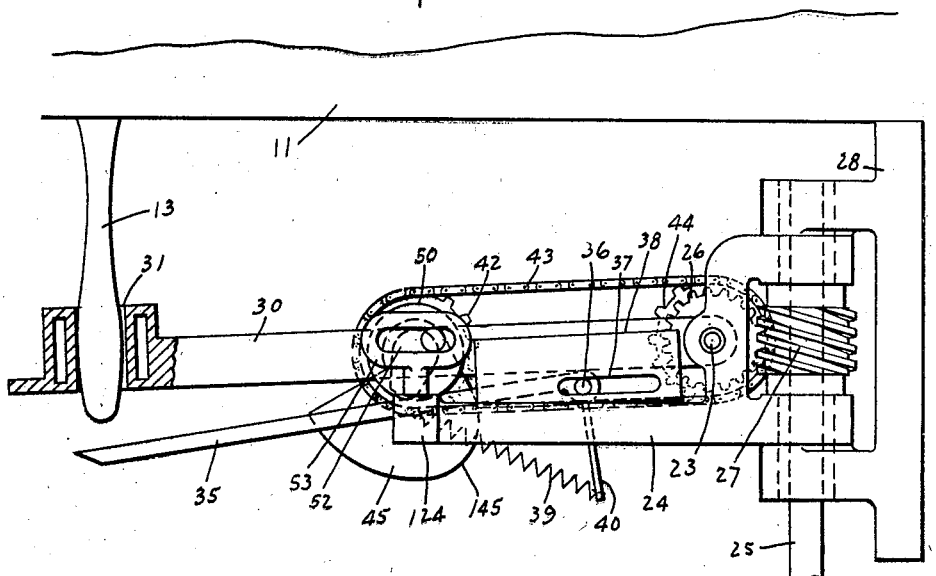
Figure 8:
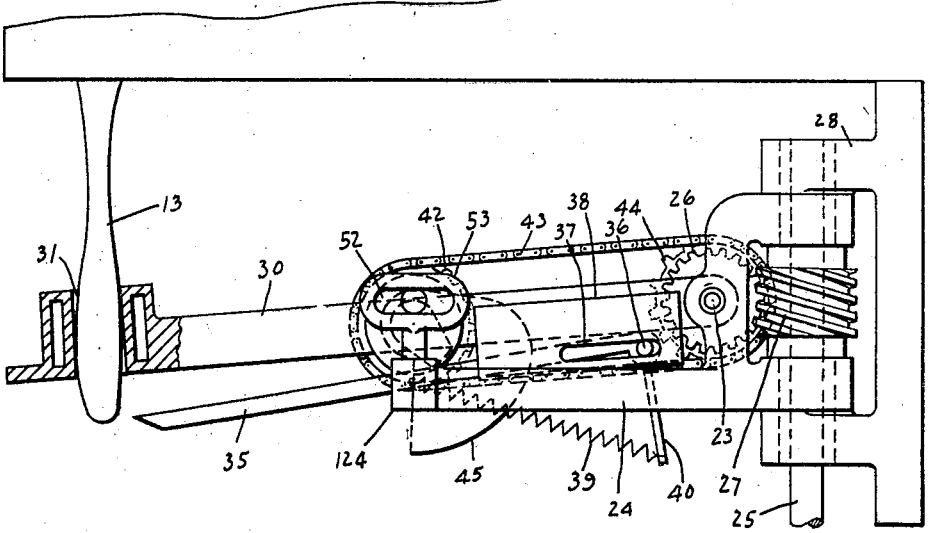

In the drawings, Fig. 1 is a central vertical section through a portion of a glass tank and its spout and associated glass feeding mechanism and a machine for making glassware associated therewith. Fig. 2 is a plan view of what is shown in Fig. 1. Fig. 3 is a vertical section of the shearing or cut-off mechanism and mold, as shown in Fig. 1, but on a larger scale. Fig. 4 is a plan view of what is shown in Fig. 2, an altered position of the shear frame being indicated by dotted lines. Fig. 5 is a side elevation of the shear mechanism shown in Fig. 3 with the parts in position after the shear or knife has been operated and the glass cut off, and a section of the mold. Fig. 6 is the same as Fig. 5 after the glass has been deposited in the mold, the lower part of the mold being broken away. Fig. 7 is the same as Fig. 3 with the parts in the stage of operation as the gather of glass is entering the shear or cut-off mechanism, the lower part of the mold being shown broken away. Fig. 8 is the same as Fig. 7 with the parts at the stage of operation subsequent to that shown in Fig. 7. Fig. 9 is a section on the line 9—9 of Fig. 2, showing parts of the device in elevation. Figs. 10 to 15 are diagrammatic vertical sections of the spout and means for controlling the discharge of glass, showing the parts in their various relative positions during the different stages of the operation.

There is shown in Fig. 1 a part of a glass tank 10 which may be of any desired construction, with its spout or boot 11 extending therefrom of any desired construction, a discharge opening 12 in the outer end thereof through which glass 13 flows or discharges and, when severed, must be deposited in the mold 14 of the glass machine, the mold being located to one side of a vertical line extending through the glass discharge opening.

The discharge opening 12 is substantially closed after each discharge of glass by a needle or plug 15 operating vertically through an opening 16 in the top of the spout or boot 11, so as to close and open the discharge opening. Said needle or plug is pivoted at its upper end to a lever or walking beam 17 and is fulcrumed between its ends at 18 to a fixed support 19. The lever or beam 17 is actuated by a connecting rod 20 pivoted at its upper end thereto.

The connecting rod 20 is actuated by an eccentric 21 having a pin 22 to which the lower end of the connecting rod 20 is pivoted. The eccentric 21 is secured on a shaft 23, seen in Figs. 2 and 9, and said shaft extends through a frame 24 that is mounted by upper and lower bearing arms on a vertical shaft 25 that at its upper end is mounted in two bearing arms on a frame 26 secured in fixed position, as shown in Fig. 1. The shaft 23 has on it a worm wheel 27 that meshes with a worm 28 on the shaft 25 so that said vertical shaft 25 drives the horizontal shaft 23 and through intermediate mechanism described operates the plug or needle 15.

The frame 24, mounted as explained above, is laterally oscillatory and carries a shear or bar 30 which is fulcrumed on the shaft 23 by a pair of divided arms lying on each side of the worm wheel 27, so that the shear frame has a vertical glass opening 31 directly under the glass discharge opening 12 of the spout 11 and the discharge or gather of glass 13 will pass through said opening. The shear or knife 35 lies under the shear frame 30, as seen in Fig. 3, and at one end is provided with a pair of laterally-extending pivot pins 60 that extend through horizontal slots 37 in plates 38 secured to the opposite sides of the shear frame 30. The knife is forced upwardly against the bottom of the shear frame by a spring 39 that extends from the lower end of a frame 40 rigidly connected with the knife 35 near its pivot and extending downwardly therefrom. The other end of the spring 39 is secured to some relatively stationary object, such as the end 124 of the horizontal oscillatory frame 24. The shear frame 30 is slotted at 130 vertically and longitudinally, and there is substantially a registering but narrower slot 135 in the cutter 35, as seen in Fig. 4. A shaft 41 extends transversely and horizontally through the shear arm 30 near the middle thereof and is driven by a sprocket wheel 42 secured thereon, a sprocket chain 43 and a sprocket 44 secured on the shaft 23. On said shaft 41 there is a cam 45 secured in position to operate in the slots 130 and 135 above described. The cam 45 is substantially triangular in shape with a rounded corner 145 and it rotates in the direction of the arrow.

Besides the cam 45 there is a smaller cam 46, as seen by dotted lines in Fig. 6. In fact, the two cams are preferably made integral, but the small cam operates only in the slot 130 of the shear arm 30. It does not register with the slot 135 in the knife 35, but as the cam is rotated, it engages the upper surface of the knife and forces it downward, as shown in Figs. 7 and 8. The function of the large cam 45 is to force the knife 35 rearwardly after the shearing operation. In its operation the periphery of the cam 45 engages the wall of the knife at the inner end of the slot 125 and the lug 47 extending upwardly from the knife at that point, as shown in Figs. 3 and 4. As the angular corner of the cam during its operation moves above and away from the lug 47, the knife is suddenly shot forward by the spring 39, from the position shown in Fig. 3 to the position shown in Fig. 6, thus severing the glass 13.

The end of the shaft 41 opposite the sprocket wheel 42 thereon has secured on it an eccentric consisting of a centrally mounted disk 50 with an eccentrically located pin 51 that projects through and operates in a horizontal slot 52 in a stationary frame or member 53 and is vertically adjustable in the end portion 124 of the laterally swinging frame 24. By this eccentric 50 and the parts described, the free end of the shearing mechanism is vertically moved in a suitable position, as shown in the drawings.

The operation of the shearing mechanism and the glass discharge mechanism will now be explained. Assuming the parts to be as shown in Fig. 1, the gather of glass 13 which has issued from the spout 11 and which extends through the hole 31 in the shear frame 30 is ready to be severed. A slightly further operation of the shaft 25 will cause the cam 45, which then is in a position shown in Fig. 3, to escape the lug 47 on the knife, and the spring 39 will force it outward from the position shown in Fig. 3 to that shown in Fig. 5, thus severing the glass and turning it so that the small or severed end will go to the bottom of the mold. It is noted that the outer end of the knife is made somewhat cup-shaped by a cylindrically-curved surface or recess 235, shown in Fig. 3, which registers with the opening 31 in the shear arm 30, as seen in Fig. 5.

The driving mechanism is geared in such manner that the needle or plug 15 will begin to descend as soon as the glass has been severed and will descend for a quarter of a revolution of the cam 45 until the angular part reaches the upward position shown in Fig. 6. While the cam has been traveling from the position shown in Fig. 5 to that shown in Fig. 6, the knife has remained unchanged, closing the bottom of the opening 31 through the shear head so that it will serve as a cup to receive and hold a glass above the knife and between the knife and the spout, as shown in Figs. 11 and 12, and during that period, the eccentric 50 and associated parts has been lifting the shear arm and knife from the position shown in Figs. 5 and 11 to that shown in Figs. 6 and 12.

During the next quarter of a revolution of the cam 45, the plug remains substantially closed and substantially prevents further discharge of the glass from the spout, as in Figs. 13 and 14. About midway between this last quarter of revolution of the cam 45, the knife and also the shear arm began to descend, the knife descending faster than the shear arm and at the end of the quarter of a revolution of the cam, said parts reach the position shown in Figs. 7 and 14. As the knife leaves the shear arm, the glass by gravity begins to protrude below the shear arm, as seen in Figs. 7 and 14.

At the beginning of the next quarter of a revolution of the cam 45, the knife is still lowered from the position shown in Fig. 4 and the plug 15 begins to ascend and the glass again to flow out of the spout, as the knife is now moving out of the way of the gather of glass, and at the end of that half revolution, the knife has been withdrawn out of the way of the glass, as shown in Figs. 8 and 15.

During the next quarter revolution of the cam 45 the plug 15 remains in its uppermost position substantially, and the knife is lifted against the bottom of the shear arm to the position shown in Figs. 5 and 10, and the glass has descended sufficiently far to be ready for another operation of the knife, and as the angular part of the cam 45 passes above the lug 47, the spring 39 again actuates the knife to sever the glass. This completes the cycle of operations of the machine.

While the plug 15 and associated mechanism for operating the same is here shown in combination with the shearing mechanism just described, the same is not necessary in actual practice, although it is preferable. In some situations and in working some kinds of glass, the shearing mechanism heretofore described is alone sufficient to handle the discharge of glass. In that case there is a continuous flow of glass from the spout and the shearing mechanism operates at times as a cup for holding the glass after there has been a severance and when a sufficient amount of glass has been received by said cup, the knife descends and moves backward out of the way to permit the glass to feed downward until there is a sufficient amount of glass for another operation of the knife. If desired, in this connection, a plug 15 may be used that is operable by hand or adjustable into fixed position for the time being for reducing or thereby controlling the rapidity of the flow of the glass. Such hand-operated or adjustable plugs are common in the art.

There is such a combination of the glass feeding mechanism heretofore described and the glass making machine as to enable the latter to operate and control the operation of the former so that various parts of the mechanism will be timed in their operations. Thus there is shown herein a glass making machine 70 of familiar type having a rotary table 71 which carries a plurality of molds 14 and arranged so that in the rotation of the table, the molds will successively be brought to a charging position, but because of the nature of the construction of the glass making machine, the charging position of the mold cannot be under the discharge opening of the spout. It must be to one side of a vertical line through the discharge opening spout. The distance the mold must be located to one side of a vertical line is dependent upon the nature of the construction.

The details of the construction of this glass making machine are unnecessary to be described, as the machine shown is of familiar type set forth in Letters Patents No. 1,350,375, patented by me August 24, 1920. It is immaterial what the details of construction thereof are for operating the table and bringing the molds in succession to be placed to be charged. After glass has been received by the mold in machines of this kind, it is a practice to introduce air under pressure for flowing the glass down in a mold for forming the neck when the mold is arranged as herein shown. Herein there is shown a blow head 17 mounted on the lower end of the vertical support 117, pivoted at its upper end to a walking beam 73 which is fulcrumed at 74 on the vertical bar 174, which at its lower end 274 is fulcrumed to a stationary post 374. The parallel beam 474 is pivotally connected to the lower end of the members 172 and 174.

The lower end of the walking beam 73 is connected by a connecting rod 175 to the piston rod 75 in the cylinder 76 mounted on the stationary part 83 of the machine and is supplied with air under pressure through the tube 77 for moving the blow head downward and over into position to engage the top of the mold 14.

The table 71 of said glass blowing machine is rotated by a shaft 90 which transmits power to a beveled gear on the underside of a plate 91 and power is transmitted from that shaft to a shaft 92 and to shaft 25 heretofore described. The plate 91 operates a pitman 191 that oscillates an arm 291 that intermittently actuates the table. There is, therefore, a fixed relation between the means for rotating the glass machine table and operating the glass feeding mechanism, whereby the mold 14 is brought into position for receiving the glass at the proper time, or the glass is severed and discharged at the proper time for the mold to receive the same. The means for controlling the air which operates the piston 79 is timed with the rotation of the table so that the blow head 72 will be brought into position on the mold 14 at the right time for blowing the same and the air will be shut off at the proper time for the blow head to be withdrawn.

Since the mold 14 is never located directly under the discharge outlet of the spout, means is provided for receiving the gather of glass, as it leaves the shear mechanism, and guiding and directing the same down into the mold. This means consists of a spoon-shaped trough-like guide 100 mounted on a post 101 and adjacent the charging position of the mold and on which the feeding funnel 102 of the mold is mounted.

This glass receiving and guiding member 100 is held at an angle preferably as great as 45 degrees from a horizontal line. The upper end thereof is spoon or bowl-shaped, and is located in a direct line under the discharge opening of the spout and where it will receive the lower end of the glass flowing from the spout, just before the knife operates to cut off the gather of glass, as seen in Fig. 3. When the knife severs the glass, as shown in Fig. 5, the severing movement thereof pushes the upper end of the gather of glass over into an unbalanced position, whereby it is caused to fall lengthwise in the guide, as shown in Fig. 6, in position to enter the mold as it leaves the guide member. Hence, it is desirable that the cutting in of the knife should be formed with a concave surface, as shown in Figs. 10 to 15. The invention, however, is not necessarily limited to a guide with a spoon-shaped upper end, for if the guide has no such spoon-shaped end, the gather of glass will slide down the same without upsetting, and thus enter the mold.

The invention claimed is:

1. The combination with a discharge spout for a glass tank having an outlet opening, of means for supporting a mold on a lower level than said spout and not in vertical alignment with said outlet opening, stationary means in fixed relation to said mold for receiving the glass from said spout and deflecting and guiding the same into said mold, the upper end of said means being cup-shaped for initially receiving the glass and the lower portion of said means furnishing an inclined guideway leading from said cup-shaped end to the mouth of the mold, substantially as set forth.

2. The combination with the discharge spout of a glass tank having an outlet opening, of a mold on a lower level than said spout but not in vertical alignment therewith, means for receiving the glass from said spout and guiding the same into said mold, said means having a cup-shaped upper end and a downwardly inclined lower portion, means for holding said glass receiving and guiding means in fixed position with the cup-shaped end thereof under the outlet opening of the spout to receive the glass as it falls therefrom, an inclined portion of said glass receiving and guiding means extending to the mouth of the mold, whereby the glass will be moved by gravity to the mold.

3. The combination with the discharge spout of a glass tank having an outlet opening, of a mold on a lower level than said outlet opening but not in vertical alignment therewith, a vertical post in fixed position near said mold, and glass receiving and guiding means secured between its ends on the upper end of said post and having its upper end cup-shaped and under the outlet opening to receive the glass as it flows by gravity from the spout, and the lower portion thereof being inclined downwardly towards the mold for guiding the glass to the mold as it moves downward by gravity from the upper cup-shaped end thereof.

4. The combination with the discharge spout of a glass tank having an outlet opening, of a mold adapted to be located at a lower level than the spout but not in vertical alignment with the opening thereof, means held stationary with relation to the mold for receiving the charge of glass and guiding it to the mold, and cut-off means for severing the glass as it flows from the spout that moves at the time of severing in a direction substantially parallel with said glass receiving and guiding means so that the severed portions of glass will be caused to topple over on said means and slide down the same inverted, substantially as shown.

5. The combination with the discharge spout of a glass tank having an outlet opening, of a mold adapted to be located at a lower level than the spout but not in vertical alignment with the opening thereof, means held stationary with relation to the mold for receiving the charge of glass and guiding it to the mold, the upper end of said means being under the outlet opening from the spout to receive the glass flowing therefrom, and means arranged to sever the glass after it has reached the upper end of said glass receiving and guiding means and pushing the top of the severed portion of glass over into substantially inverted position on said glass receiving and guiding means so that it will descend by gravity and be guided into the mold.

6. The combination with the discharge spout of a glass tank having an outlet opening, of a mold adapted to be located at a lower level than the spout but not in vertical alignment with the opening thereof, means held stationary with relation to the mold for receiving the charge of glass and guiding it to the mold, the upper end of said means being under the outlet opening from the spout to receive the glass flowing therefrom, and a knife for severing the glass adapted to operate after the glass has reached the glass receiving and guiding means, said knife being movable in a direction parallel with the glass receiving and guiding means so as to upset the severed portion of glass upon said means and enable it to descend by gravity and longitudinally into the mold.

7. The combination with the discharge spout of a glass tank having an outlet opening, of a mold adapted to be located at a lower level than the spout but not in vertical alignment with the outlet opening thereof, means held stationary with relation to the mold for receiving the charge of glass and guiding it to the mold, a vertically movable arm mounted below the spout with a fixed opening therethrough registering with the outlet opening from the spout, and a knife independently operable in connection with said arm and below the same for closing the opening therethrough when in one position and severing the glass suspended from said arm when the knife is moving to said position.

8. The combination with the discharge spout of a glass tank having an outlet opening, of a mold adapted to be located at a lower level than the spout but not in vertical alignment with the outlet opening, means held stationary with relation to the mold for receiving the charge of glass and guiding it to the mold, a vertically movable arm mounted under said spout and having a fixed opening therethrough registering with the opening in the spout for receiving the glass, and a knife mounted in connection with said arm and under the same and adapted to move therewith and be independently and reciprocably operated, so that when in one position it will close the bottom of the opening in said arm, and in one of its movements will sever the glass after it reaches said receiving and guiding means.

9. The combination with the discharge spout of a glass tank having an outlet opening, of a mold adapted to be located at a lower level than the spout but not in vertical alignment with the opening thereof, means held stationary with relation to the mold for receiving the charge of glass and guiding it to the mold, vertically movable means for severing the charge of glass after it reaches said glass receiving and guiding means, and means for operating the severing means so that it will temporarily support the remaining glass after said charge of glass has been severed.

9. The combination with the discharge spout of a glass tank having an outlet opening, of a mold adapted to be located at a lower level than the spout but not in vertical alignment with the opening thereof, means held stationary with relation to the mold for receiving the charge of glass and guiding it to the mold, and means for controlling the movement of glass from the spout to said glass receiving and guiding means including a vertically movable member having an opening through which the glass flows, a knife operating adjacent the underside of said member for severing the glass, and means for temporarily holding the knife in its actuated position for closing the lower end of said opening and thus forming a cup for temporarily receiving and holding the unsevered portion of the glass.

11. The combination with the discharge spout of a glass tank having an outlet opening, of a mold adapted to be located at a lower level than the spout but not in vertical alignment with the opening thereof, means held stationary with relation to the mold for receiving the charge of glass and guiding it to the mold, and means for controlling the movement of glass from the spout to said glass receiving and guiding means including a member having an opening through which the glass is adapted to flow, a knife operating adjacent the underside of said member and having a recess in the upper side of the knife adapted to register with the opening in said member after the knife has been actuated to close the bottom of said opening and form a cup, and means for temporarily holding the knife in its actuated position for receiving and holding the unsevered portion of the glass.

12. The combination with the discharge spout of a glass tank having an outlet opening, of a mold adapted to be located at a lower level than the spout but not in vertical alignment with the opening thereof, means held stationary with relation to the mold for receiving the charge of glass and guiding it to the mold, means mounted between the spout and the glass receiving and guiding means for severing the glass and temporarily supporting the unsevered portion of glass, and means for temporarily elevating the glass severing means after the glass has been severed.

13. The combination with the discharge spout of a glass tank having an outlet opening, of a mold adapted to be located at a lower level than the spout but not in vertical alignment with the opening thereof, means held stationary with relation to the mold for receiving the charge of glass and guiding it to the mold, and means for controlling the movement of glass from the spout to said glass receiving and guiding means including a vertically movable member having a fixed opening through which the glass is adapted to flow, a knife for severing the glass, a shear arm mounted below the spout under the discharge opening from the spout, and means for reciprocably mounting the knife on the underside of said shear arm in position to sever the glass and temporarily close the bottom of the opening through the shear arm to form a cup for temporarily supporting the unsevered portion of the glass.

14. The combination with the discharge spout of a glass tank having an outlet opening, of a mold adapted to be located at a lower level than the spout but not in vertical alignment with the opening thereof, means held stationary with relation to the mold for receiving the charge of glass and guiding it to the mold, and means for controlling the movement of the glass from the spout to said glass receiving and guiding means including a member having an opening through which the glass is adapted to flow, a knife for severing the glass, a shear arm mounted below the spout under the discharge opening from the spout, means for reciprocably mounting the knife on the underside of said shear arm in position to sever the glass and temporarily close the bottom of the opening through the shear arm to form a cup for temporarily supporting the unsevered portion of the glass, and means for elevating the shear arm after the glass has been severed.

15. The combination with the discharge spout of a glass tank having an outlet opening, of a mold adapted to be located at a lower level than the spout but not in vertical alignment with the opening thereof, means held stationary with relation to the mold for receiving the charge of glass and guiding it to the mold, and means for controlling the movement of the glass from the spout to said glass receiving and guiding means including a member having an opening through which the glass is adapted to flow, a knife for severing the glass, a shear arm mounted below the spout under the discharge opening from the spout, and means for mounting the knife reciprocably on the underside of said shear arm for severing the glass, said knife having a recess in the upper side thereof adapted to register with the opening through the shear arm after the glass has been severed and cooperating with the shear arm in forming a cup for temporarily receiving and holding the unsevered portion of the glass.

In witness whereof I have hereunto affixed my signature.

EDWARD MILLER.